April 28, 1942. R. DUFOUR ET AL 2,280,771
METHOD OF BAKING OR VULCANIZING INDIA-RUBBER OR SIMILAR MATERIALS
Filed Oct. 14, 1935

Inventors:
René Dufour &
Henri Auguste Leduc
Attorneys:

Patented Apr. 28, 1942

2,280,771

UNITED STATES PATENT OFFICE 2,280,771

METHOD OF BAKING OR VULCANIZING INDIA-RUBBER OR SIMILAR MATERIALS

René Dufour, Paris, and Henri Auguste Leduc, Asnieres, France

Application October 14, 1935, Serial No. 44,974
In Luxemburg April 5, 1935

10 Claims. (Cl. 18—53)

The present invention relates to methods of baking or vulcanizing India-rubber or similar materials.

The object of the present invention is to provide a method of this kind which permits of heating in a satisfactory manner all the parts of the mass and especially the inner portion thereof, so that the operation can be carried out in a very short time and in a manner as homogeneous as it is desired.

One feature of the present invention consists in placing the mass to be treated between metallic parts arranged in such manner as to constitute the respective electrodes of a condenser, which is devised in such manner as to have electric properties such that the heating of the mass results from the calorific effects which are produced in the dielectric of the condenser.

Still another feature of the present invention consists in combining the heating of the mass, obtained by an effect of dielectric viscosity or hysteresis of an electric condenser, a heating due to a Foucault effect, by placing in the presence of the matters treated substances which become heated in an alternating electromagnetic field, said field being preferably produced by an auxiliary inductor circuit.

Other features of the present invention will result from the following detailed description of some specific embodiments thereof.

Preferred embodiments of the present invention will be hereinafter described, with reference to the accompanying drawing, given merely by way of example, and in which.

Figure 1:
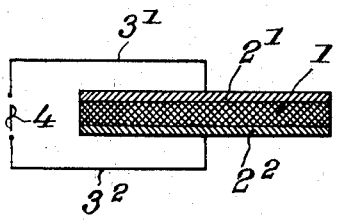
Figs. 1 and 2 are diagrammatic longitudinal sectional views of two different devices, respectively, for carrying out the method according to the present invention.

The invention concerns the vulcanization of India rubber.

The raw materials to be treated according to the invention consist of latex, gums, rubber cakes or sheets, regenerated rubber, or any other equivalent material. We incorporate with these materials the usual ingredients necessary for vulcanization, such as sulphur, plastifiers, accelerators or the like.

According to an embodiment of the invention, we proceed as will be hereinafter explained, with reference to Figs. 1 to 6 of the annexed drawing.

After having given the nonvulcanized mass $1$ any desired shape, said mass is introduced between two metallic pieces $2^1$ and $2^2$ capable of forming the electrodes or systems of electrodes of an electric condenser. These electrodes are connected through wires $3^1$ and $3^2$ respectively to the terminals of a source of alternating current $4$, of a relatively high frequency, this frequency ranging for instance between 1 and 10 millions per second and being eventually higher.

As rubber, or the analogous material to be treated constitutes a dielectric matter, the whole of elements $1$, $2^1$ and $2^2$ constitutes a condenser in which the heating of the mass of rubber is due to the calorific effects that take place in the dielectric.

In ordinary condensers, it is endeavoured to reduce as much as possible the importance of the calorific effects so as to improve the efficiency of the condenser. On the contrary, according to the invention, the condenser is so devised and its characteristics are so chosen that these effects are such as to produce a suitable heating of mass $1$ without taking into account the efficiency of the apparatus considered as a condenser.

Eventually, the degree of heating may be influenced at will so as to increase or reduce the calorific effect in the desired manner, by incorporating into the mass, through combination or admixture, and either uniformly or not, substances such as silica, lampblack, oxides or sulfides, some resins, proteic matters (casein), etc., among which silica has the property of reducing the disengagement of heat, while zinc sulfide has the property of increasing this disengagement.

We may also interpose between the electrodes and the mass to be treated one or several dielectrics of a nature different from that of rubber and which, due to the dielectric effect, are more or less heated than rubber, so as to finally obtain a suitable thermic effect for the whole. In a likewise manner, we may make the electrodes of a metal of a suitable thermal conductivity, or heat insulate in a suitable manner the inner and/or outer faces of these electrodes so as to increase or reduce the heat losses toward the outside.

Eventually, we may combine the heating obtained through the effect of dielectric viscosity or hysteresis with the heating produced by Foucault currents, by placing into contact with the rubber mass $1$ metallic or other particles capable of being heated in an alternating magnetic field preferably produced by an inductor winding suitably disposed with respect to the mass to be treated. Among these substances we may cite, by way of example:

Particles or powders of metals such as aluminum, ferro-magnetic materials, antimony, zinc;

Powdered metallic salts, such as carbides, for instance iron carbide, carborundum, etc., lead or zinc or other sulfides;

Metalloids such as carbon (lampblack or carbon black) graphite;

Electrolytes such as saline solutions, for instance ammonium or sodium carbonate.

These substances, by being heated by an induction effect, either maintain their initial form, such for instance as aluminum or iron powders, or undergo, under the effect of heat, a transformation favorable to the product to be obtained. Thus, for instance, zinc or antimony, in the presence of an amount of sulfur higher than that necessary for the desired vulcanization yield, under the effect of heat, a zinc or antimony sulfide the presence of which in rubber may be desired or necessary.

On the other hand, by incorporating into the mass both a metallic powder such as zinc and a strong oxidant, such as hydrogen peroxide or "per-salts" (perborates, perchlorates, etc.) we obtain, by heating, zinc oxide which constitutes one of the most commonly used fillers. By incorporating into the mass water and impure aluminum powder (amalgam) there is formed alumina and hydrogen, which, when liberated, gives a sponge-like or porous structure to the mass.

The incorporation of the substances above indicated takes place in the manner commonly used for the introduction of fillers and by means of the same apparatus, the distribution of said substances in the mass of latex, rubber, etc. being as uniform as possible.

Owing to this combination or superposition of the two effects above mentioned, it is possible to improve or to facilitate the heating of the mass to be treated and to simplify the electrical conditions to be complied with, for finally obtaining a heating of the mass with a view to subjecting it to a thermal treatment, such as vulcanization for which the temperatures to be considered range between 100 and 170° C.

By proceeding as above stated for the second embodiment, we obtain, in a very short period of time and in a simple and efficient manner, a thorough heating of the whole mass to be treated, without the qualities or properties of rubber being altered or influenced.

For instance, with the following composition of matter:

| | Parts by weight |
|---|---|
| Smoked rubber sheets | 100 |
| Zinc oxide | 10 |
| Sulphur | 3 |
| Accelerator | 1 |

Any amount of a colouring matter.

It is possible to obtain, with an alternating source of 300 watts and of a frequency of about 10 millions per second, feeding current to a condenser the electrodes of which are located at a distance of from 3 to 10 cms. from each other, a heating up to a temperature of about 120° C. of a mass of rubber of a volume of about one cubic decimeter, placed between these electrodes for a period of time of about 10 minutes. It should be noted that the working of the condenser involves a uniform heating of the whole mass and that it suffices to stop the working of the condenser for stopping the heating as soon as the latter has become sufficient.

In Figs. 1 to 6 we have shown some characteristic examples of various possible applications of the invention.

In Fig. 1, the condenser consists of two plane electrodes $2^1$ and $2^2$, this arrangement being suitable, for instance, for treating any sheets, plates and carpets of rubber, for the treatment of sponge-like rubber, for that of gum-coated fabrics, and, in a general way, for the treatment of rubber pieces the lateral faces of which, of determined or indefinite width, are substantially parallel to each other.

Figure 2:
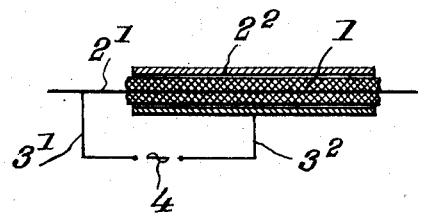

In Fig. 2, we have shown a metallic wire or cable coated with a sheath of rubber or the like. In this case, the electrode $2^1$ consists of the wire to be coated with rubber and the electrode $2^2$ consists of a cylindrical element coaxial with wire $2^1$. The whole of wire $2^1$ and its non-vulcanized coating may be caused to move forward in a continuous manner and with a suitable velocity in the direction of the axis of sleeve $2^2$, with a certain interval left between the rubber coating and the inner wall of sleeve $2^2$. Preferably, vulcanization takes place immediately after the wire has been coated with gum or latex and, eventually, after providing the whole with a suitable fabric reinforcement.

Figure 3:
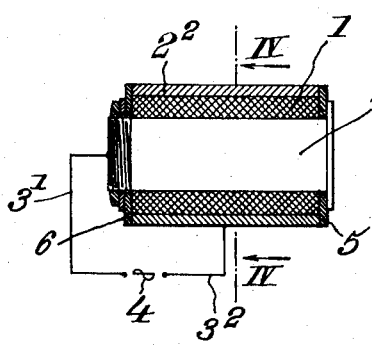
Fig. 3 is a longitudinal sectional view of a device corresponding to another embodiment of the invention.
Figure 4:
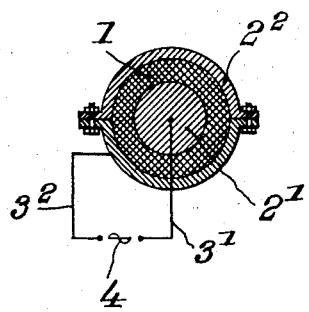
Fig. 4 is a sectional view on the line IV—IV of Fig. 3.

In Figs. 3 and 4, we have also shown devices for applying the principle of a cylindrical condenser for obtaining a rubber piece I of tubular shape. In this case, the electrode $2^1$ consists of a metallic core and the electrode $2^2$ is a coaxial mould made of several elements and the inner face of which is at a substantially uniform interval from the outer face of core $2^1$. This interval is closed laterally by means of side plates 5 and 6 fixed in any suitable manner to the core $2^1$ in such manner as to avoid porosity of the rubber treated in the apparatus.

Figure 5:
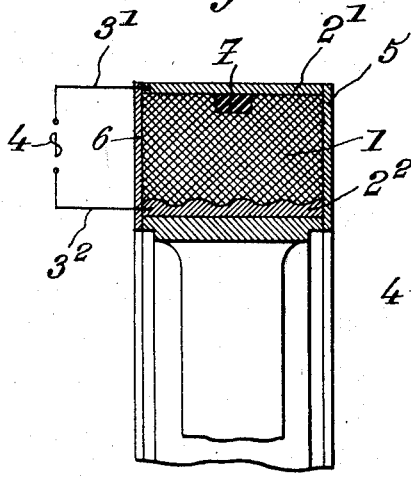
Figs. 5 and 6 are diagrammatic sectional views, respectively, of two other devices for carrying out the method according to the invention.

In Fig. 5, we have shown the application of the invention to the obtainment of a piece I of annular shape, such as a solid rubber tire for a wheel. In this case, the piece to be vulcanized is placed between two annular metallic electrodes $2^1$ and $2^2$ of a condenser fed with current in the manner above explained. In this particular case, the ring or band which usually acts as a support for the gum may be utilized as the electrode $2^2$. When the rubber piece I is to be provided with projections or recesses on its outer face, it is possible to obtain this shape by applying on the inner face of electrode $2^1$ one or several pieces such as 7, made of a dielectric matter, such as a product consisting chiefly of synthetic resin, for instance. In this way, we maintain a substantially constant interval between electrodes $2^1$ and $2^2$, which is advantageous for obtaining a uniform heating of mass I.

Figure 6:
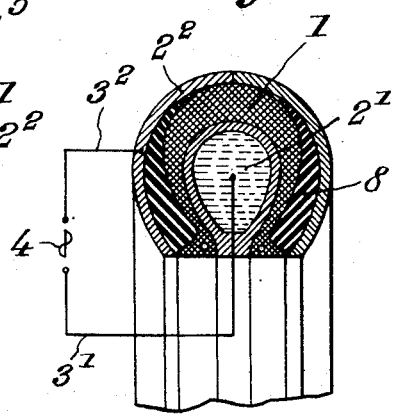

In Fig. 6 we have shown a similar arrangement for the treatment of a pneumatic tire cover I, the irregular external shape of which requires the interposition of intermediate pieces 8, made of an insulating or dielectric material, between the inner core $2^1$, such for instance as a water bag and the external mould $2^2$, in order that the space between the corresponding faces of the electrodes may be sufficiently uniform.

The method according to the present invention makes it possible to perform, in a very simple manner, the homogeneous vulcanization of the most various rubber products, and especially articles of considerable thickness, without the duration of the vulcanization treatment depending upon the size of the mass that is treated.

On the contrary, with the methods of vulcanizing rubber employed up to the present time, the outside of the mould is heated by means of heating plates or hot fluids and it follows that for large size pieces it is practically impossible to obtain a uniform vulcanization of the mass, the peripheral part of said mass being always more vulcanized than the central part, or in the case of the surface of the article being normally vulcanized, the central part of the article being not sufficiently vulcanized.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What we claim is:

1. A method of heating and vulcanizing a heterogeneous mass composed of pure rubber and conventional vulcanizing ingredients for rubber having different dielectric constants from pure rubber, comprising placing the mass to be treated as a dielectric between spaced metallic elements forming the electrodes of an electric condenser, and supplying an alternating current having at least a periodicity of the order of a million cycles per second to said elements.

2. A method of heating and vulcanizing a heterogeneous mass composed of pure rubber, conventional vulcanizing ingredients for rubber having different dielectric constants from pure rubber, and particles of a conductive material heatable in an alternating current electromagnetic field, comprising placing the mass to be treated as a dielectric between spaced metallic elements forming the electrodes of an electric condenser, and in an electromagnetic field, and simultaneously heating said mass by energizing said electromagnetic field and by supplying an alternating current having at least a periodicity of the order of one million cycles per second to said elements.

3. A method as in claim 2, said conductive material comprising a metallic powder.

4. A method as in claim 2, said conductive material comprising a powdered metallic salt.

5. A method as in claim 2, said conductive material comprising a metalloid.

6. A method as in claim 1, which further includes placing between said metallic elements at least one piece of dielectric material in juxtaposition to said mass to be treated.

7. The method of forming an article from thermosetting material which comprises enclosing the material in a mold having a cavity formed to the shape of the article for receiving the material, producing a high frequency alternating electric field in the material, and heating the material by the stresses produced by the electrostatic forces of the field for a sufficient time to completely cure the material in the form of the article while the mold remains at a relatively lower temperature.

8. A process of heat treating a vulcanizable mass, including a rubber like material comprising subjecting said mass to an applied electrostatic field having a frequency of at least approximately one million cycles per second.

9. A process of heat treating a vulcanizable mass comprising subjecting said mass to an applied electrostatic field having a frequency of at least approximately one million cycles per second.

10. A process for obtaining a chemical combination between a rubber like material and modifying ingredients therefor, comprising subjecting a mix of said material and said ingredients to an applied electrostatic field having a frequency of at least approximately one million cycles per second.

RENÉ DUFOUR.
HENRI AUGUSTE LEDUC.